United States Patent
Ell et al.

(10) Patent No.: US 8,020,442 B2
(45) Date of Patent: Sep. 20, 2011

(54) HIGH BANDWIDTH INERTIAL MEASUREMENT UNIT

(75) Inventors: Todd A. Ell, Savage, MN (US); Robert D. Rutkiewicz, Edina, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 730 days.

(21) Appl. No.: 12/154,400

(22) Filed: May 22, 2008

(65) Prior Publication Data

US 2009/0288485 A1   Nov. 26, 2009

(51) Int. Cl.
*G01P 3/44*   (2006.01)

(52) U.S. Cl. .......................... 73/510; 73/503; 73/504.02

(58) Field of Classification Search ............... 73/510, 73/503, 504.02, 514.02; 701/220
See application file for complete search history.

(56) References Cited

U.S. PATENT DOCUMENTS

| | | |
|---|---|---|
| 4,084,774 A | 4/1978 | Kimberley |
| 4,125,017 A | 11/1978 | Dhuyvetter et al. |
| 4,179,818 A | 12/1979 | Craig |
| 4,188,816 A | 2/1980 | Mairson |
| 4,445,376 A | 5/1984 | Merhav |
| 4,566,327 A | 1/1986 | Rider |
| 4,590,801 A | 5/1986 | Merhav |
| 4,601,206 A | 7/1986 | Watson |
| 4,870,588 A | 9/1989 | Merhav |
| 5,363,700 A | 11/1994 | Joly et al. |
| 5,383,363 A | 1/1995 | Kulmaczewski |
| 6,128,955 A * | 10/2000 | Mimura ........................ 73/510 |
| 2010/0268414 A1 * | 10/2010 | Petillon et al. ................. 701/34 |

OTHER PUBLICATIONS

Chen et al., "Gyroscope Free Strapdown Inertial Measurement Unit by Six Linear Accelerometers," Journal of Guidance, Control, and Dynamics, vol. 17, No. 2, Mar.-Apr. 1994.*

* cited by examiner

*Primary Examiner* — John Chapman, Jr.
(74) *Attorney, Agent, or Firm* — Scott D. Wofsy; Edwards Angell Palmer & Dodge LLP

(57) ABSTRACT

An inertial measurement unit is disclosed which includes a system of gyros for sensing angular rates, a system of accelerometers for sensing angular accelerations, an integrator for deriving gyro-less angular rates from the sensed angular accelerations, and a complimentary filter for blending the sensed angular rates and the gyro-less angular rates to produce a virtual angular rate output for the inertial measurement unit.

20 Claims, 2 Drawing Sheets

HIGH BANDWIDTH INERTIAL MEASUREMENT UNIT

BACKGROUND OF THE INVENTION

1. Field of the Invention

The subject invention is directed to inertial measurement systems, and more particularly, to an inertial measurement unit that blends the output from an arrangement of low-bandwidth gyroscopes with the output from an arrangement of high-bandwidth accelerometers to extend the effective bandwidth of the system.

2. Description of Related Art

Micro-electric mechanical sensors (MEMS) are often used as gyroscopes (gyros) and accelerometers to perform inertial measurements in inertial navigation systems employed in vehicles. For example, a standard inertial measurement unit (IMU) uses a triad or three-axis gyro arrangement to sense angular rate (sometimes referred to as angular velocity). Accelerometers are used to sense linear acceleration along a given axis and are also used to sense tangential acceleration due to changing angular rate (sometimes referred to as angular acceleration). Prior art IMUs have employed accelerometers as a redundant source of angular rate in the event of a gyro sensor failure, and accelerometers have also been employed in gyro-less IMUs.

Current MEMS gyros are limited in effective bandwidth because of the high noise levels that are inherently associated with them, such as, for example, gyro angle random walk noise and gyro rate random walk noise. Furthermore, high bandwidth MEMS gyros are relatively expensive as compared to MEMS accelerometers of much higher bandwidth. In general, the bandwidth of the accelerometers used in an IMU is an order of magnitude higher than the bandwidth of the gyros used in an IMU. It would be beneficial to extend the effective bandwidth of a gyro-based IMUs angular rate output by taking advantage of less expensive, higher bandwidth accelerometers.

SUMMARY OF THE INVENTION

The subject invention is directed to a new and useful inertial measurement unit for use in an inertial navigation system of a vehicle, such as, for example, a space vehicle, that includes a system of gyros for sensing angular rates, a system of accelerometers for sensing angular accelerations, means for deriving gyro-less angular rates from the sensed angular accelerations, and means for blending the sensed angular rates and the gyro-less angular rates to produce a virtual angular rate output for the inertial measurement unit. The virtual angular rate output inherits the wider bandwidth of the accelerometers. As a result, the overall bandwidth of the inertial measurement unit is aligned with the bandwidth of the accelerometers, which is typically an order of magnitude higher than the bandwidth of the gyros.

Preferably, the system of gyros is a geometric arrangement of three gyros oriented along sense axes that are normal to three faces of a right-angled cube and the system of accelerometers is a geometric arrangement of six accelerometers oriented along sense axes that are diagonal across the faces of a right-angled cube.

The inertial measurement unit further includes means for generating a total angular rate from the sensed angular rates of the three gyros and means for generating a total angular acceleration from the sensed angular accelerations of the six accelerometers. Preferably, the means for deriving gyro-less angular rates from sensed angular accelerations includes means for integrating the total angular acceleration.

The inertial measurement unit further includes a high-pass filter for removing low frequency noise from the gyro-less angular rates and a low-pass filter for removing high frequency noise from the total angular rate. Preferably, the two filters are matched to have the same cut-off frequency. That is, where the low-pass filter begins to roll-off in gain the high-pass filter begins to roll-up in gain at the same rate. It is also envisioned that the two filters and the integrating means can be combined into one multi-input, single-output (MISO) filter.

The subject invention is also directed to a method of inertial measurement that includes the steps of sensing angular rates, sensing angular accelerations, deriving gyro-less angular rates from the sensed angular accelerations, and blending the sensed angular rates and the gyro-less angular rates to produce a total virtual angular rate output. Preferably, the angular rates are sensed by a system of three gyros oriented along sense axes that are normal to three faces of a right-angled cube and the angular accelerations are sensed by a system of six accelerometers oriented along sense axes that are diagonal across the faces of a right-angled cube.

The method further includes the step of generating a total angular rate from the angular rates sensed by each of the three gyros and the step of generating a total angular acceleration from the angular accelerations sensed by each of the six accelerometers. Preferably, the step of deriving gyro-less angular rates from the sensed angular acceleration includes the step of integrating the total angular acceleration. The method further includes the steps of filtering the gyro-less angular rates to remove low frequency signals or noise and filtering the total angular rates to remove high frequency signals or noise.

These and other features of the subject invention and the manner in which it is employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the inertial measurement system of the subject invention without undue experimentation, preferred embodiments thereof will be described in detail hereinbelow with reference to certain figures, wherein.

DETAILED DESCRIPTION OF PREFERRED EMBODIMENTS

Figure 3:
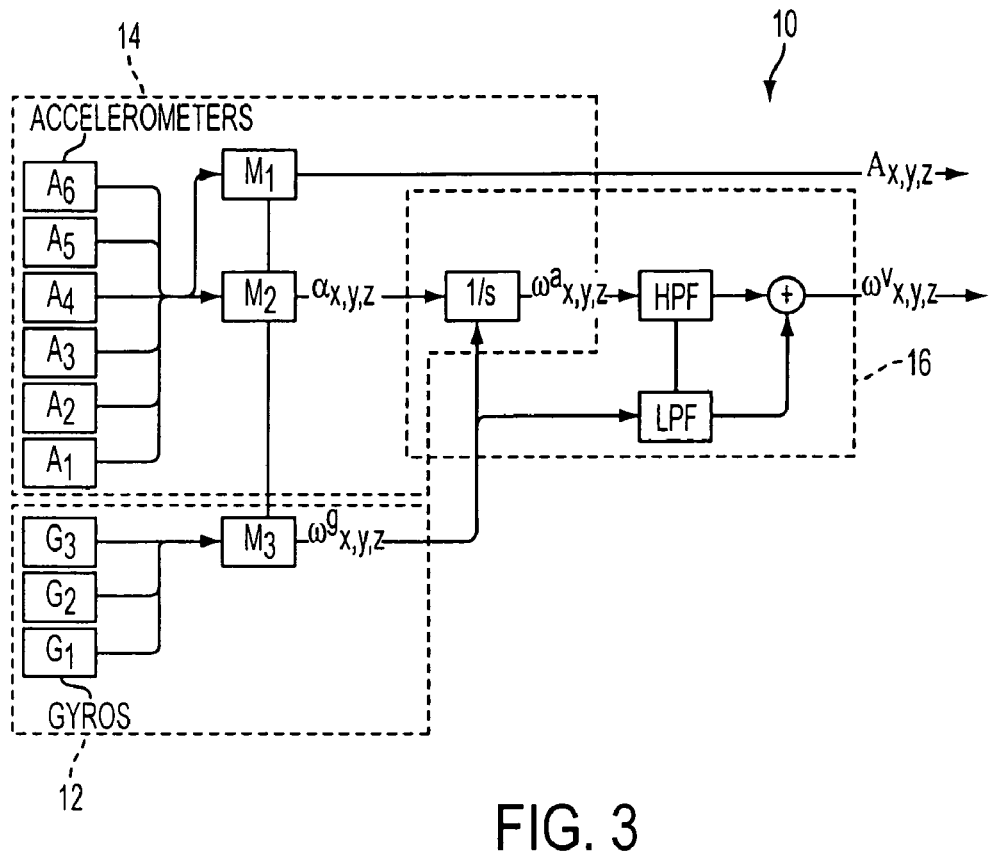
FIG. 3 is a schematic representation of a high bandwidth inertial measurement unit configured in accordance with a preferred embodiment of the subject invention.

Referring now to the drawings, there is illustrated in FIG. 3, a MEMS-based inertial measurement unit (IMU) configured in accordance with a preferred embodiment of the subject invention and designated generally by reference numeral 10. IMU 10 is designed for use in an inertial navigation system of a vehicle, such as, for example, a space vehicle. IMU 10 includes, among other things, a system of gyros 12 for sensing angular rate (i.e., angular velocity) from vehicle rotations, a system of accelerometers 14 for sensing angular accelerations from vehicle rotations. As explained below, the sensors are arranged to sense rotations and linear accelerations along any axis.

IMU 10 further includes embedded software for deriving gyro-less angular rates from the sensed angular accelerations obtained by the system of accelerometers 14, and for combining or otherwise blending the angular rates sensed by the system of gyros 12 with the gyro-less angular rates derived from the sensed angular accelerations, to produce a total virtual angular rate output for the IMU 10. In doing so, the effective bandwidth of IMU 10 is extended as compared to typical gyro-based IMUs.

Figure 1:
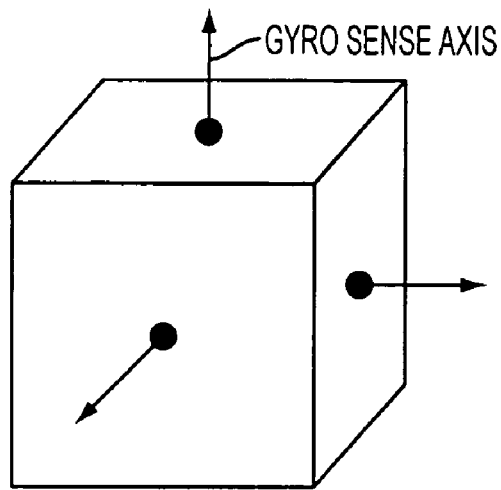
FIG. 1 is an illustration of a geometric configuration of gyros for sensing angular rate in an inertial measurement unit, wherein the gyros sense normal to three faces of a right-angled cube (i.e., out of the top, right and forward faces)

The system of gyros 12 of IMU 10 is arranged as a triad with the geometric configuration illustrated in FIG. 1, wherein three gyros ($G_1$, $G_2$ and $G_3$) sense normal to three faces of a right-angled cube (i.e., out of the top, right and forward faces). The gyros are isolated from one another so that motion sensed by any single sensor would be undetected by the remaining two, e.g., normal to the faces of a right-angled cube. To eliminate sizing effect errors, the gyro output represents the total rotation of the vehicle at a single point.

Figure 2:
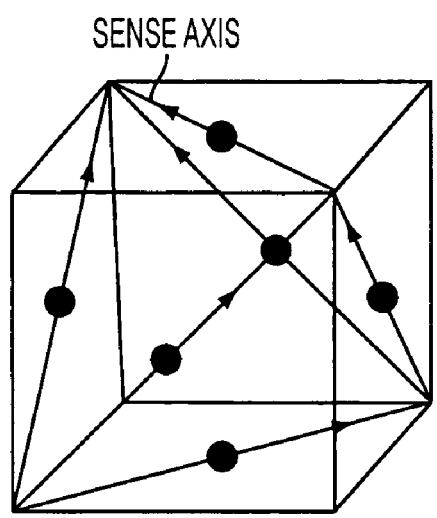
FIG. 2 is an illustration of the geometric configuration of accelerometers for sensing tangential acceleration in an inertial measurement unit due to changing angular rate (i.e., angular acceleration), wherein the sense axis of the six accelerometers are diagonal across the faces of a right-angled cube.

For purposes of this invention, the system of accelerometers 14 can not be put into the same configuration as the gyros. If the accelerometers were so arranged, the linear acceleration at a single point would be achieved, but it would be unable to measure angular acceleration. Thus, the system of accelerometers 14 of IMU 10 preferably has the geometric configuration illustrated in FIG. 2, wherein the sense axes of six single-axis accelerometers ($A_1, A_2, A_3, A_4, A_5$ and $A_6$) are oriented diagonally across the six faces of a right-angled cube. In this geometric configuration each accelerometer in system 14 senses differing centripetal acceleration, from which angular and linear acceleration values can be obtained. Those skilled in the art should readily appreciate that the sensitivity of the accelerometers will be a function of their respective separation distances or equivalently the edge distance of the cube.

Referring to FIG. 3, by summing properly weighted combinations of outputs from the six accelerometers ($A_1, A_2, A_3, A_4, A_5$ and $A_6$) using a configuration matrix $M_1$, which combines and maps the six outputs to a coordinate system, the total linear acceleration $A_{x,y,z}$ is obtained. Similarly, by summing combinations of the six accelerometers ($A_1, A_2, A_3, A_4, A_5$ and $A_6$) in a configuration matrix $M_2$, using different weights, a total angular acceleration $\alpha_{x,y,z}$ is obtained.

Then, by integrating the sensed total angular acceleration $\alpha_{x,y,z}$ using a scaling integrator (denoted in Laplace transform space as 1/s) a total gyro-less angular rate, $\omega^a_{x,y,z}$ is generated. To compliment the gyro-less angular rate, the total gyro angular rate, $\omega^g_{x,y,z}$ is also obtained. This is achieved by summing properly weighted combinations of the three gyros ($G_1$, $G_2$ and $G_3$) in a gyro configuration matrix $M_3$, which combines and maps the three gyro outputs to a coordinate system.

IMU 10 includes a complimentary filter arrangement 16 for blending the integrated angular acceleration or gyro-less total angular rate ($\omega^a_{x,y,z}$) with the total gyro angular rate ($\omega^g_{x,y,z}$) so as to generate a virtual angular rate output ($\omega^v_{x,y,z}$) for IMU 10 that possesses the higher bandwidth associated with the accelerometers. More particularly, a high-pass filter (HPF) is provided to remove low frequency signals or noise from the total gyro-less angular rate ($\omega^a_{x,y,z}$) passed therethrough and a low-pass filter (LPF) is provided to remove high frequency signals or noise from the total gyro angular rate ($\omega^g_{x,y,z}$) passed therethrough. Preferably, the two filters are matched to have the same cut-off frequency. That is, where the low-pass filter begins to roll-off in gain the high-pass filter begins to roll-up in gain at the same rate.

Figure 4:
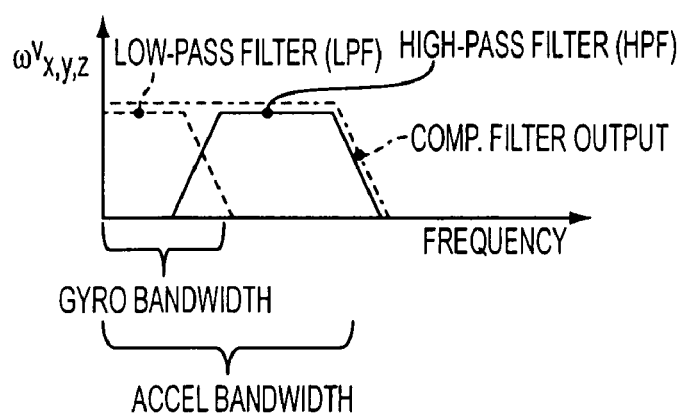
FIG. 4 is a graph showing the frequency response of the complimentary filter of the high bandwidth inertial measurement unit shown in FIG. 3.

Referring to FIG. 4, there is graphically illustrated the frequency response of each component of IMU 10 and the resulting overall response of the system. In particular, the low-pass filtered, low-bandwidth gyro angular rate output obtained from the system of gyros 12 is shown in intersection with the high-pass filtered, high bandwidth gyro-less angular rate output derived from the system of accelerometers 14. In addition, the blended virtual angular rate output of the complimentary filter 16 is shown, which has the higher bandwidth of the accelerometers.

Those skilled in the art should readily appreciate that the structure of the complimentary filter 16 shown in FIG. 3 is for illustrative purposes only and is not intended to limit the scope of the subject invention in any way. Indeed, it is envisioned and well within the scope of the subject invention that the two filters (high-pass and low-pass) and the integrator can be combined into one multi-input, single-output (MISO) filter.

It is envisioned that the complimentary filter 16 could be replaced with an integrated Kalman filter to optimize the blending of the gyro-sensed angular rate and accelerometer sensed angular acceleration, taking into account the relative noise characteristics of both types of sensors. This would have the added benefit of allowing for sensor error source corrections (e.g., gyro and accelerometer scale-factor errors).

Since this system includes a redundant source of angular rate in the form of the gyro-less angular rate, it is possible to determine the moment-arm to the center-of-rotation of the vehicle to which the unit is mounted. This moment-arm causes errors in higher level systems using the IMU such as an Attitude Reference System (ARS) (e.g., self-erection errors in roll due to high airspeed slow turn rate vehicle maneuvers). In some applications the moment-arm distance cannot be pre-determined due to changes in vehicle loading (either cargo or fuel usage). So being able to determine this moment-arm on-the-fly would improve these kinds of systems by providing an estimate of the moment arm vector.

While the subject invention has been shown and described with reference to preferred embodiments, those skilled in the art will readily appreciate that various changes and/or modifications may be made thereto without departing from the spirit and/or scope of the subject invention as defined by the appended claims.

What is claimed is:

1. An inertial measurement unit comprising:
   a) a system of low bandwidth gyros for sensing angular rates;
   b) a system of high bandwidth accelerometers for sensing angular accelerations;
   c) means for deriving gyro-less angular rates from the sensed angular accelerations; and
   d) means for blending the sensed angular rates and the derived gyro-less angular rates to produce a virtual angular rate output for the inertial measurement unit, wherein the virtual angular rate output possesses the higher bandwidth associated with the accelerometers, such that an overall bandwidth of the inertial measurement unit is aligned with the bandwidth of the accelerometers.

2. An inertial measurement unit as recited in claim 1, wherein the system of gyros is a geometric arrangement of three gyros oriented along sense axes that are normal to three faces of a right-angled cube.

3. An inertial measurement unit as recited in claim 2, further comprising means for generating a total angular rate from the sensed angular rates of the three gyros.

4. An inertial measurement unit as recited in claim 3, wherein the means for generating a total angular rate from the sensed angular rates of the three gyros includes a configuration matrix.

5. An inertial measurement unit as recited in claim 3, further comprising a low-pass filter for removing high frequency noise from the total angular rate generated from the sensed angular rates of the three gyros.

6. An inertial measurement unit as recited in claim 1, wherein the system of accelerometers is a geometric arrangement of six accelerometers oriented along sense axes that are diagonal across the faces of a right-angled cube.

7. An inertial measurement unit as recited in claim 6, further comprising means for generating a total angular acceleration from the sensed angular accelerations of the six accelerometers.

8. An inertial measurement unit as recited in claim 7, wherein the means for generating a total angular acceleration from the sensed angular accelerations of the six accelerometers includes a configuration matrix.

9. An inertial measurement unit as recited in claim 7, wherein the means for deriving gyro-less angular rates from sensed angular accelerations includes means for integrating the total angular acceleration.

10. An inertial measurement unit as recited in claim 1, wherein the system of accelerometers is adapted and configured to sense linear acceleration and angular acceleration.

11. An inertial measurement unit as recited in claim 1, further comprising a high-pass filter for removing low frequency noise from the gyro-less angular rates.

12. A method of inertial measurement comprising the steps of:
   a) sensing angular rates using a system of low bandwidth gyros;
   b) sensing angular accelerations using a system of high bandwidth accelerometers;
   c) deriving gyro-less angular rates from the sensed angular accelerations; and
   d) blending the sensed angular rates and the derived gyro-less angular rates to produce a total virtual angular rate output possessing the higher bandwidth associated with the accelerometers.

13. A method of inertial measurement according to claim 12, wherein the angular rates are sensed by a system of three gyros oriented along sense axes that are normal to three faces of a right-angled cube.

14. A method of inertial measurement according to claim 13, further comprising the step of generating a total angular rate from the angular rates sensed by each of the three gyros.

15. A method of inertial measurement according to claim 14, further comprising the step of filtering the total angular rate generated from the angular rates sensed by each of the three gyros to remove high frequency noise.

16. A method of inertial measurement according to claim 12, wherein the angular accelerations are sensed by a system of six accelerometers oriented along sense axes that are diagonal across the faces of a right-angled cube.

17. A method of inertial measurement according to claim 16, further comprising the step of generating a total angular acceleration from the angular accelerations sensed by each of the six accelerometers.

18. A method of inertial measurement according to claim 17, wherein the step of deriving gyro-less angular rates from the sensed angular acceleration includes the step of integrating the total angular acceleration.

19. A method of inertial measurement according to claim 12, further comprising the step of sensing linear accelerations.

20. A method of inertial measurement according to claim 12, further comprising the step of filtering the gyro-less angular rates to remove low frequency noise.

* * * * *